(12) United States Patent
Ranganathan et al.

(10) Patent No.: US 10,678,866 B1
(45) Date of Patent: Jun. 9, 2020

(54) RULES DRIVEN CONTENT NETWORK FOR TRACKING, TRACING, AUDITING AND LIFE CYCLE MANAGEMENT OF INFORMATION ARTIFACTS

(71) Applicants: Vasumathi Ranganathan, Skillman, NJ (US); Gerald Kukko, Orleans (CA)

(72) Inventors: Vasumathi Ranganathan, Skillman, NJ (US); Gerald Kukko, Orleans (CA)

( * ) Notice: Subject to any disclaimer, the term of this patent is extended or adjusted under 35 U.S.C. 154(b) by 407 days.

(21) Appl. No.: 15/673,279

(22) Filed: Aug. 9, 2017

Related U.S. Application Data (60) Provisional application No. 62/402,281, filed on Sep. 30, 2016.

(51) Int. Cl.
| | | |
|---|---|---|
| *G06F 16/93* | (2019.01) | |
| *G06F 21/62* | (2013.01) | |
| *G06F 16/21* | (2019.01) | |
| *G06F 16/248* | (2019.01) | |
| *G06F 16/33* | (2019.01) | |
| *G06F 16/9535* | (2019.01) | |

(Continued)

(52) U.S. Cl.
CPC ............ *G06F 16/93* (2019.01); *G06F 16/211* (2019.01); *G06F 16/248* (2019.01); *G06F 16/334* (2019.01); *G06F 16/9535* (2019.01); *G06F 21/6227* (2013.01); *G06F 40/166* (2020.01); *G06F 40/197* (2020.01); *G06F 16/9024* (2019.01); *H04L 67/10* (2013.01)

(58) Field of Classification Search
CPC .. G06F 16/9024; G06F 16/93; G06F 21/6227; G06F 16/211; G06F 16/248; G06F 16/334; G06N 5/022
See application file for complete search history.

(56) References Cited

U.S. PATENT DOCUMENTS

| | | |
|---|---|---|
| 5,991,782 A | 11/1999 | Miyagawa et al. |
| 6,529,905 B1 | 3/2003 | Bray et al. |

(Continued)

*Primary Examiner* — Mark D Featherstone
*Assistant Examiner* — Navneet Gmahl
(74) *Attorney, Agent, or Firm* — Thomas J. Germinario (57) ABSTRACT

A novel computer-based method and associated network database architecture is described to solve the problem of the management, tracking, tracing, auditing, and life cycle management of information artifacts within a content network. In the context of the content network, information artifacts represent models and relationships associated with documents, components, collections, structures, metadata, tasks, milestones, objectives. All information artifacts that define the content network are represented as individual nodes within the network database, which can be a graph database, or a graph-enabled relational or multi-model database. Relationships that exist between the node and its parent node, between nodes representing individual information artifacts or a set of artifacts, as well as reference links to external sources where the information artifact may have originated (such as an external database or system) are represented as a set of edges. Life cycle states of the node representing the information artifact (such as draft, approved) and metadata describing the artifact are also maintained within the structural graph representing the information artifact. Rules related to each node, such as access control or relationship rules will also be maintained for each node individually.

4 Claims, 8 Drawing Sheets

(51) Int. Cl.
  *G06F 40/166* (2020.01)
  *G06F 40/197* (2020.01)
  *H04L 29/08* (2006.01)
  *G06F 16/901* (2019.01)

(56) References Cited

U.S. PATENT DOCUMENTS

| | | | |
|---|---|---|---|
| 8,122,367 | B2 | 2/2012 | Krieger et al. |
| 8,650,195 | B2 | 2/2014 | Pedersen |
| 9,247,021 | B1 | 1/2016 | Obbard et al. |
| 2012/0290926 | A1 | 11/2012 | Kapadia et al. |
| 2013/0246049 | A1* | 9/2013 | Mirhaji ............... G06F 17/274 704/9 |
| 2013/0275429 | A1 | 10/2013 | York et al. |
| 2014/0129504 | A1* | 5/2014 | Soon-Shiong ......... G06N 5/043 706/47 |
| 2015/0012528 | A1 | 1/2015 | Kapadia |
| 2016/0275436 | A1* | 9/2016 | Kurjanowicz ............................. G06Q 10/063114 |
| 2018/0082043 | A1* | 3/2018 | Witchey ................ G16H 10/40 |

* cited by examiner

RULES DRIVEN CONTENT NETWORK FOR TRACKING, TRACING, AUDITING AND LIFE CYCLE MANAGEMENT OF INFORMATION ARTIFACTS

REFERENCE TO RELATED APPLICATION

This application claims the benefit of the filing date of U.S. Provisional Application No. 62/402,281, filed Sep. 30, 2016, which is incorporated herein by reference.

FIELD OF INVENTION

The present invention relates to an integrated set of services to deliver a productivity and compliance platform for a rules driven content network for tracking, tracing, auditing and life cycle management of information artifacts (including models and relationships associated with documents, components, collections, structures, metadata, tasks, milestones, objectives and other information artifacts) as related to the field of enterprise information management, component-based content management, structured content authoring and tracking systems, and more particularly to the use of network database technology in connections with such systems.

BACKGROUND OF THE INVENTION

In research intensive regulated industries, information is the source of innovation, and many content and information sources feed the research and product development pipeline. The ability to create, share, reuse, navigate, find, and protect essential information is critical to getting products approved by regulators and launched successfully.

Much of the information created, shared, and reviewed/approved today is captured across multiple databases, repositories and mainly in information artifacts and unstructured documents developed throughout the product development life cycle. The information captured in unstructured documents or a set of unstructured documents compiled into information artifacts such as submission dossiers are published to submit to regulatory agencies for product approvals. Many of these dossiers or documents are comprised of sub-components which are themselves comprised of content generated by experts, scientists, and systems, increasing both the complexity and volume of information about a product. The information artifacts and documents created and managed within these tools have been largely used to create flat structures (i.e. documents). These formats do not lend themselves to structuring the content within the document, and have hindered enhanced uses of the information to exploit the knowledge for key needs, such as reuse across documents and systems, change impact assessments and decisions.

Structuring the information within these information artifacts into meaningful re-usable components, and being able to create intelligence (applying metadata, defining the relationships) about the components is essential to making key decisions during the information generation, authoring, review, and approval processes for quality, consistency, and improved efficiencies. Maintaining traceability of reused components will facilitate easier assessment of impacts of component changes.

Enterprise Information Management (EIM) solutions supported by Component Content Management (CCM) and/or Structured Content Management (SCM) systems will improve quality, consistency, and deliver significant value and efficiencies in creating, reviewing, and approving the thousands of related compilations of information or documents created through the product development life cycle. Structuring the content also promotes easier methods for downstream uses of the information currently embedded in documents by allowing the appropriate components of content to be published/output into required formats for downstream systems or applications.

In the current state of technology, there is a lack of user-friendly tools to facilitate easy ways to manage the foundational information models that represent the structure of a compilation of information, such as regulatory submissions dossiers or documents in the biopharmaceutical industry, or other regulated industries. Existing tools in use do not provide productivity tools that are easy to use, dynamically configurable and extensible to manage the end-to-end processes for structured component content management and authoring. Additionally, the traditional technologies that are implemented using relational databases are difficult to extend in a user-friendly manner.

SUMMARY OF THE INVENTION

The invention is to provide a productivity platform comprising a set of integrated services to enable Enterprise Information Management (EIM) and Component Content Management (CCM) that collectively provide "accelerators" to significantly improve end-to-end information life cycle management. The following are some of the particular capabilities of the present invention:

1. The ability to configure metadata models to leverage managed metadata or managed terms from their master data sources (such as a master data repository) or external sources for their documentation processes, with the following particulars:
   The model should be dynamically extensible and configurable to address changing business processes and needs.
   The model should allow configurability to allow external sources of the data to be configured so that data can be pulled from the source database or source.
   Traceability needs to be maintained from the metadata term and the information models, or documents they are linked to.
   The model should be exportable so that the user can set up and populate new environments (for example Development, Test and Production environments for the user's system).

2. A configurable comprehensive, flexible information model for each information artifact structure (such as a submissions dossier), document type and all related components within an entire process life cycle that is linked to all related documents.

3. Providing tools to leverage the managed metadata and the information models relating to the information artifacts 4. Providing the ability to bind managed metadata to nodes or components within the information artifact within document templates.

5. Allowing authors to easily find and insert components of content within standard word processing and spreadsheet formats in a way that does not require an understanding of the backend models and information architecture.

6. Providing useful dashboards to allow users to easily navigate through their documents, components and related nodes on the information artifact to provide information needed to make appropriate business decisions quickly.

7. Providing tools to set up security policies for content access and role-based functional access at each information artifact node level.

8. Providing tools to easily configure business rules on how content is managed within the platform at each information artifact node level.

9. Enabling workflows to support review and approvals of information artifacts, components and documents and to maintain a broader end-to-end perspective from authoring to submission/publication.

10. Providing an immutable audit trail through use of blockchain technology, in combination with network database technology, to enable tracking of all activities related to information artifact nodes, components, structured group of components and/or documents, thereby creating an unalterable end-to-end chain of custody for the information artifacts.

Figure 1:
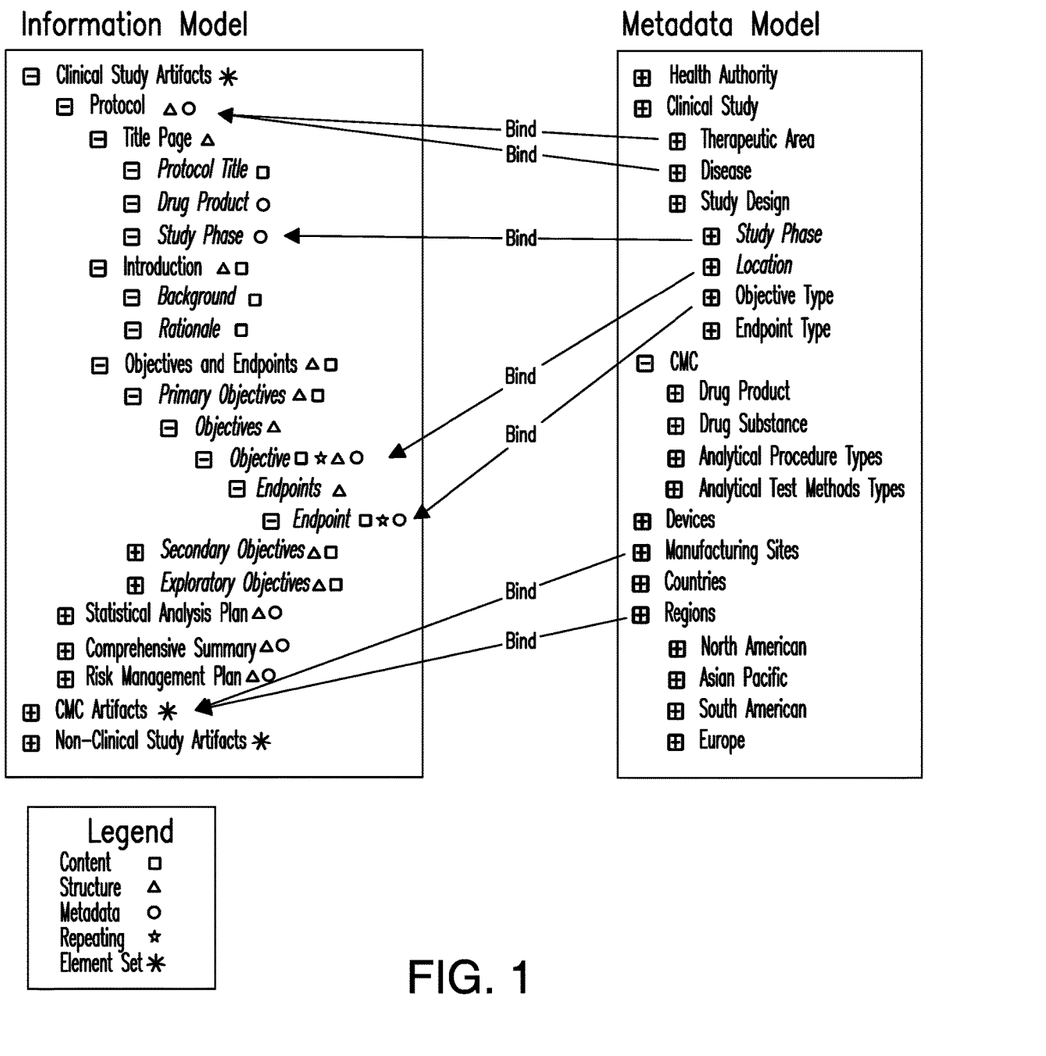
FIG. 1 is a schematic diagram illustrating metadata bound to an information model.

The following are some distinguishing features of the present invention:

1. Information modeling tools to develop, modify, maintain and govern metadata and information models for a set of information artifacts comprising one or more components or documents relating to specific business applications and needs;

2. Separation of metadata and information model creation/maintenance from the process of managing standard document templates, where the model can be dynamically configured, extended to any level, and bound to metadata or content components, as illustrated in FIG. 1.

3. Features and functionality to link the metadata and information artifacts represented by the models to the document templates easily and maintain full traceability of these links;

4. Enhancement of document templates with standard features, such as content controls within the documents; and 5. Tools to transform configured information artifacts represented by the information models into dynamically generated forms for data entry.

The present invention is directed to the use of network database technology to model a related set of information artifacts used in a component based information management, authoring and tracking system. As used herein, the term "network database" means a graph database, or a graph-enabled relational or multi-model database. Component or topic-based authoring systems provide the framework for organizing and editing the elements of a structural document that is decomposed into meaningful components that may contain text, tables, lists, figures, images, and graphics relevant to the output being represented within the document. The components of the document are represented as a structural sequence representing the information backbone, which is analogous to a table of contents.

The business problem of tracking and maintaining the traceability of components within the information artifact or structural document and across information artifacts or documents, where they are reused or repurposed, is widely known. Typically, once a user (also referred to as author) of a component authoring system is ready to publish the final output in the format of an unstructured information artifact or document, the published output or artifact is stored in a repository such as a file system or a content management system. At this point, the published document lacks the ability to track if any of its components are re-used in other documents, or where the user may have sourced the component from (i.e. the component's lineage). In other words, there is no capability to maintain bi-directional and/or one-to-many and many-to-many relationships. In current solutions, the primary way to reliably preserve these connections or linkages relies on structured content management systems that typically use a structured markup language such as XML to track connections between the various elements of the publication in an immutable manner. This is also commonly referred to as referential integrity.

The present invention presents a new approach to using a network database architecture to solve the problem of the tracking and management of information artifacts that make up a collection of content components, such as a submissions dossier or an unstructured content, artifact or document. The essence of the invention is that all components, whether within an information artifact comprising a compiled set of components or within a structurally decomposed document, are represented as individual nodes within the network database, and each re-usable component is represented as a specialized relationship with the reuse type (reuse as-is, or repurpose) and rule that is associated with it. Relationships that exist between the node and its parent node, between the node within one artifact or document structure to another where it is reused, as well as reference links to external sources where the node may have originated (such as an external database or system) are represented as a set of edges. The life cycle state of the node (such as draft, approved, released) is also maintained at the component level within the structural graph representing the information artifact component.

Published content is also represented as a graph structure, using nodes of another class. The relationship between these nodes is represented as a set of edges, and a collection of nodes represents a document or a digital media artifact. In order to maintain and manage the relationship between the components within the published output and the original sourced components, there is a linkage between the network database system and the published document, to enable 'where used' tracking via the network database. The linkage is achieved via a unique digital identifier that represents the node, enabling tracking of the components via the network database in the back end. The essence of the present invention is to use a network database as a library catalog in a novel approach to track the relationship between individual components that make up documents.

Figure 2A:
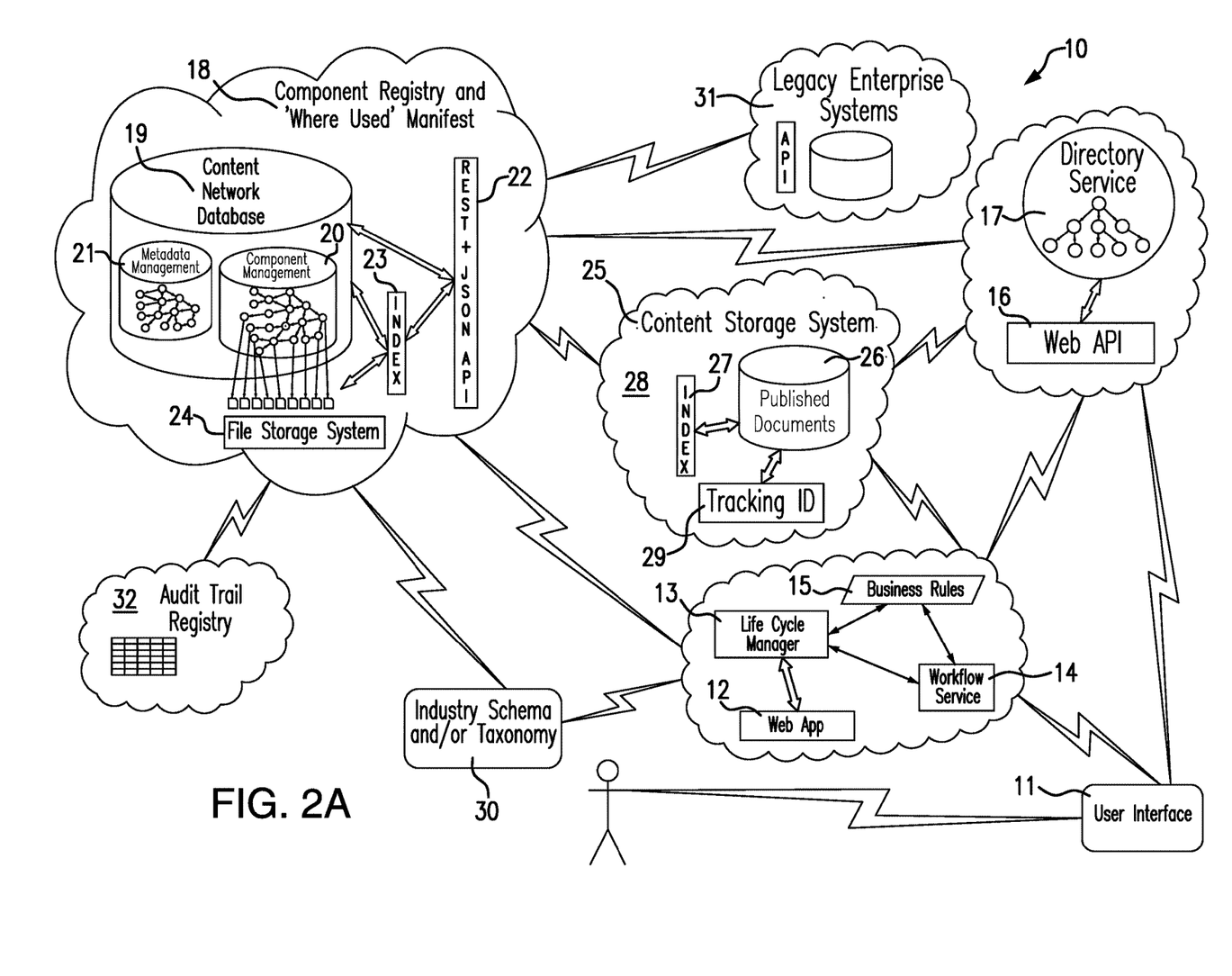
FIG. 2A is a schematic depiction of the network database architecture of the present invention.

The structural representation of the information artifact or document during the authoring process, review/approval process of the individual components, and the published output are all managed and tracked via the network database. The system architecture 10 is illustrated in FIG. 2A, wherein the reference numbered items are described as follows:

11 User Interface

The system extends commonly used modern user interfaces (Web based or client side) by providing role-based capabilities focused on reusing and repurposing information that is driven by life cycle-based business rules. Governance based on using industry schemas and/or taxonomies (refer to #20) are used to create, revise, review, reuse, repurpose, approve and publish information in support of regulatory compliance activity. Secure access to the system and other associated systems is facilitated via open authentication standards.

12 Web Application

At the heart of the solution is a modern Web application that calls upon a configurable life cycle manager to intelligently and efficiently manage component re-use in compliance with regulatory information, governed by applicable industry schemas and taxonomies (refer to #20). The Web application drives the review, revision, approval, reuse, repurpose and publishing of information based on life cycle and context. It intelligently tracks and manages the discrete units of work, using business rules and workflows that are orchestrated by the life cycle manager (refer to #3).

13 Life Cycle Manager

Figure 2B:
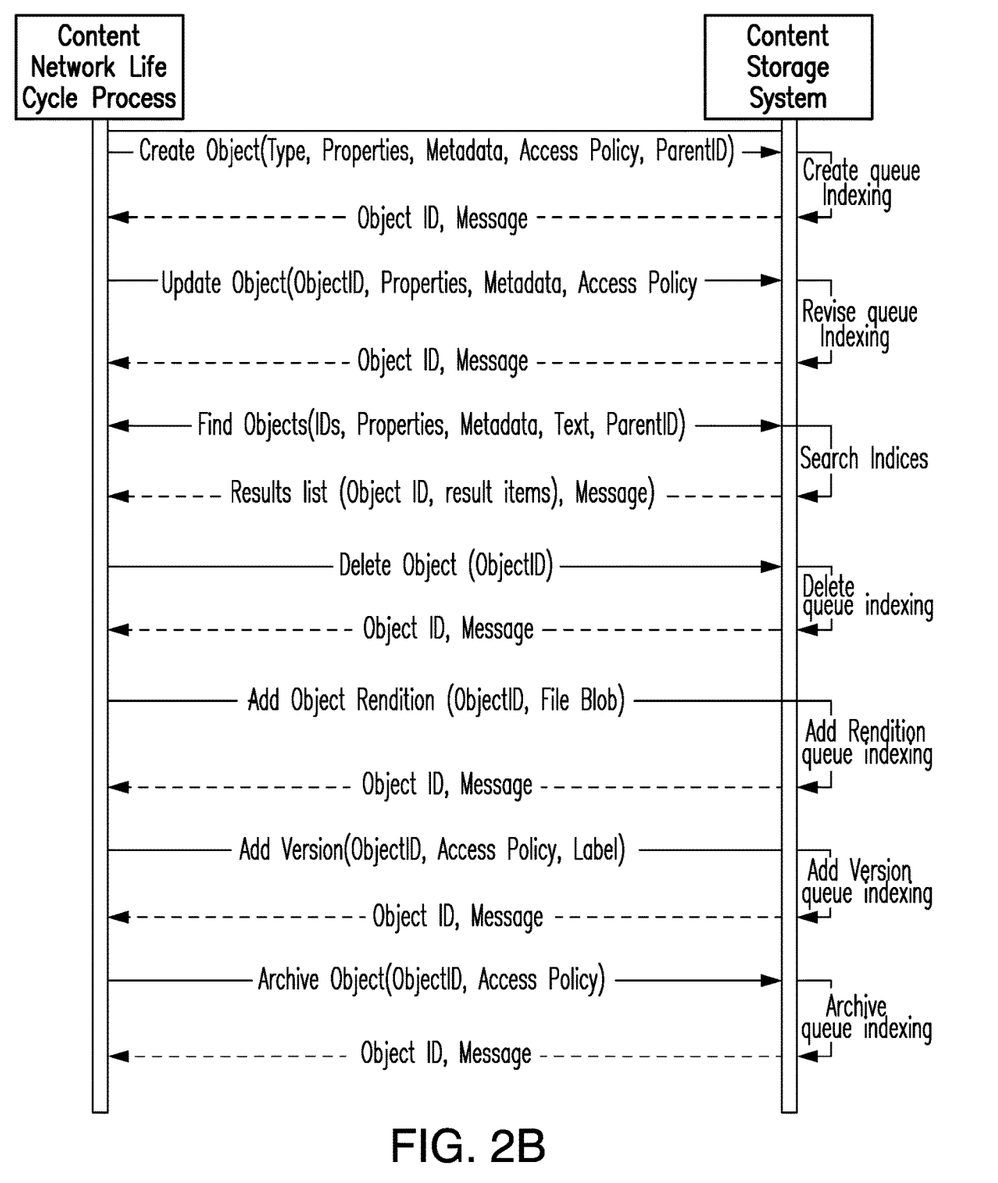
FIG. 2B is a sequence diagram depiction of the content network life cycle process of the present invention.

The life cycle manager uses defined business rules to initiate and manage life cycles (also refer to FIG. 2B), expressed by states (e.g. review-approve-publish). This includes initiating life cycles within life cycles (nested life cycles) and the rules associated with roles-based access control to actions performed on the component, and the transitioning of states. Thus, the life cycle manager supports long running business processes end-to-end by managing the complexities of life cycles associated with a well-defined and highly organized set of business rules. Life cycles are maintained at the individual information artifact node level as well as business appropriate composite node levels.

14 Workflow Management

The life cycle manager invokes instances of workflows and/or tasks and task lists to distribute work to users and roles named in the trusted directory service (refer to #7). Workflow processes are used to control and track the life cycle via state changes at the individual information artifact node level as well as business appropriate composite node levels.

15 Business Rules

The life cycle manager uses business rules specific to business domain to control, invoke and manage business processes. The business rules are configurable using roles-based access control methodologies. Business rules are configured at the individual information artifact node level as well as at the appropriate composite node levels appropriate for the business process.

16 Web API

To support secure single sign on (SSO), the system supports a Web API (Application Programming Interface) based on open authentication standards.

17 Directory Service

To control access to information, and to access processes controlled by the life cycle manager and tasks or task lists, the user is registered via a trusted directory service. The directory service provides global identity service support single sign-on via the issuing a SAML 2.0 token.

18 Component Registry and "Where Used" Manifest

The component registry registers and manages the manifest of where the different revisions and versions of components are being used, i.e. which component belongs to which information artifact, including one-to-one and one-to-many relationships. The basis for the component registry is an extensible model where each component is under control of the life cycle manager, which governs and tracks the reuse or repurposing of the component to generate a new revision and/or version. The system can produce a manifest of one or more components in the registry, showing the end-to-end chain of custody for the information artifacts, based on life cycle rules.

19 Network Database

The network database allows for a base set of information artifacts and their relationships to be defined, to bring context to the information artifacts that have been registered by the system. It serves as the abstract layer for the artifacts to be managed, and it enables the system to track the artifacts' relationship to each other (e.g. nested parent-child relationships). The network database manages a set of business objectives that define the strategic initiative, operational, administrative and/or regulatory aspects that require strict governance of information. As business requirements evolve and business processes need to be updated, the network database can be seamlessly extended to meet the new information management needs, without requiring database schema changes.

20 Component Management

Within the network database, the system can support the extension of the database to manage the existing set of information artifacts and their associated relationships to other registered information artifacts. The system supports a base/generalized set of information artifacts that at a minimum include artifacts such as tasks, documents and related components, organizations and product references. Instances of the component database extends this base set to the business domain's information management needs.

21 Metadata Management

An integral part of the system is the ability for the artifact management network database to access and use the associated metadata management network database (refer to #10) as an authoritative source of information. The registered metadata is used to instantiate the properties embedded in the vertices and edges of the network database, as well as variables embedded in the component contents.

22 REST and JSON API

To facilitate the integration of the platform components, the system uses a modern Internet stack API (Application Programming Interface) based on REST (Representational State Transfer) to support the creation of a scalable Web Service. In addition, the solution utilizes the open standard format of JSON (JavaScript Object Notation) to transmit data objects in a consistent and standards based manner. By using REST and JSON, the API for the system can be evolved and adjusted seamlessly as the business needs evolve.

23 Index (Component Registry)

The network database indexes are used to first and foremost search the properties of the vertices and edges. In addition, if the defined information artifact requires BLOB (binary large object) files to be stored for a given vertex in the graph, the solution indexes that as well. The indexes are accessed by the system's API to find and retrieve information.

24 File Storage System

Based on the business needs, the system uses a File Storage System to store information artifacts and associates them to the vertices in the graph.

25 Content Storage System

The system integrates with content storage systems via extensible Web Services. The integration is designed to integrate with the system capabilities and the features of the content storage system, ranging from simple file storage systems to full featured Enterprise Content Management (ECM) systems providing a set of content management services with complete check-out and check-in functionality at the minimum.

26 Published Artifacts

The life cycle manager can publish information artifacts or documents based on the embedded business rules. As an example, if the information artifact is in a state of draft or review, the artifact may be published in an editable format to a collaborative workspace, whereas if the artifact is in a state of approval, it may be published to a records management system in a read-only format. The life cycle manager can intelligently invoke polymorphic processes based on properties of the information being managed and tracked for information artifacts such as documents. The system can publish information into other systems, such as content storage systems, in accordance with the associated schema and/or taxonomy.

27 Index (Published Artifacts)

An index is utilized to support life cycle managed business rules that trigger actions such as the notification of change to a component being used "as is" or a variant thereof which was repurposed. To achieve this, the system accesses the index of the content storage system to find artifacts or documents that have been inadvertently moved. That is, when the life cycle manager publishes an information artifact or document to a content storage system, it needs to be able to locate the information artifact or document if it has been moved, and to be able to re-create the association for tracking purposes. This operation is performed by searching on the tracking ID (refer to #19).

28 API

At a minimum, the content storage system delivers an API to access the document in order to be able to create, read, update and delete the document (CRUD operations). If a more extensive API is available, including features such as check-in and check-out, the solution can be extended to utilize the enhanced capabilities.

29 Tracking ID

To support locating published information artifacts or documents that may have been inadvertently moved to a different folder location, at publication time the system embeds digital tracking ID's into the artifact nodes and the content artifact's content as indexable hidden text, so that the tacking ID's can be indexed and the corresponding artifact or document can be located via search. The Tracking ID is embedded into the document properties as well. The tracking ID is part of the metadata registry for the artifact or document that includes the checksum of the published information artifact or document, which is used to verify the integrity of the contents.

30 Industry Schema and/or Taxonomy

For the given regulated business domain, there may be an industry schema and/or taxonomy that governs and controls the content and/or structure of information which the business needs to be in compliance with. The solution supports the creation, maintenance and management of a set of information artifacts and organizational structures as well as the publishing of information using the relevant schemas and taxonomies. This includes the means to ingest and apply such controls with respect to structuring information, and use of controlled vocabularies defined by regulatory and/or standards bodies.

31 Legacy Enterprise System

The system integrates with Legacy Enterprise Systems such as Enterprise Resource Management (ERP), Customer Relationship Management (CRM) etc. to access, and if permitted, update authoritative sources of information. The system may be configured to connect and synchronize to the information stored in Legacy Enterprise Systems.

32 Audit Trail Registry

Blockchain technology is used as the basis for audit trail tracking for business transactions for regulatory compliance. This enables management of the immutable chain of custody of regulatory content and information artifacts created by the life cycle governed actions, combined with transaction integrity. Therefore, all compliance-based activities will be recorded via a blockchain-driven process, such as the task of digitally signing an information artifact or adding a new version of an information artifact, and adding metadata to the information artifact.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope of the foregoing summary description.

DETAILED DESCRIPTION OF THE PREFERRED EMBODIMENTS

Figure 3:
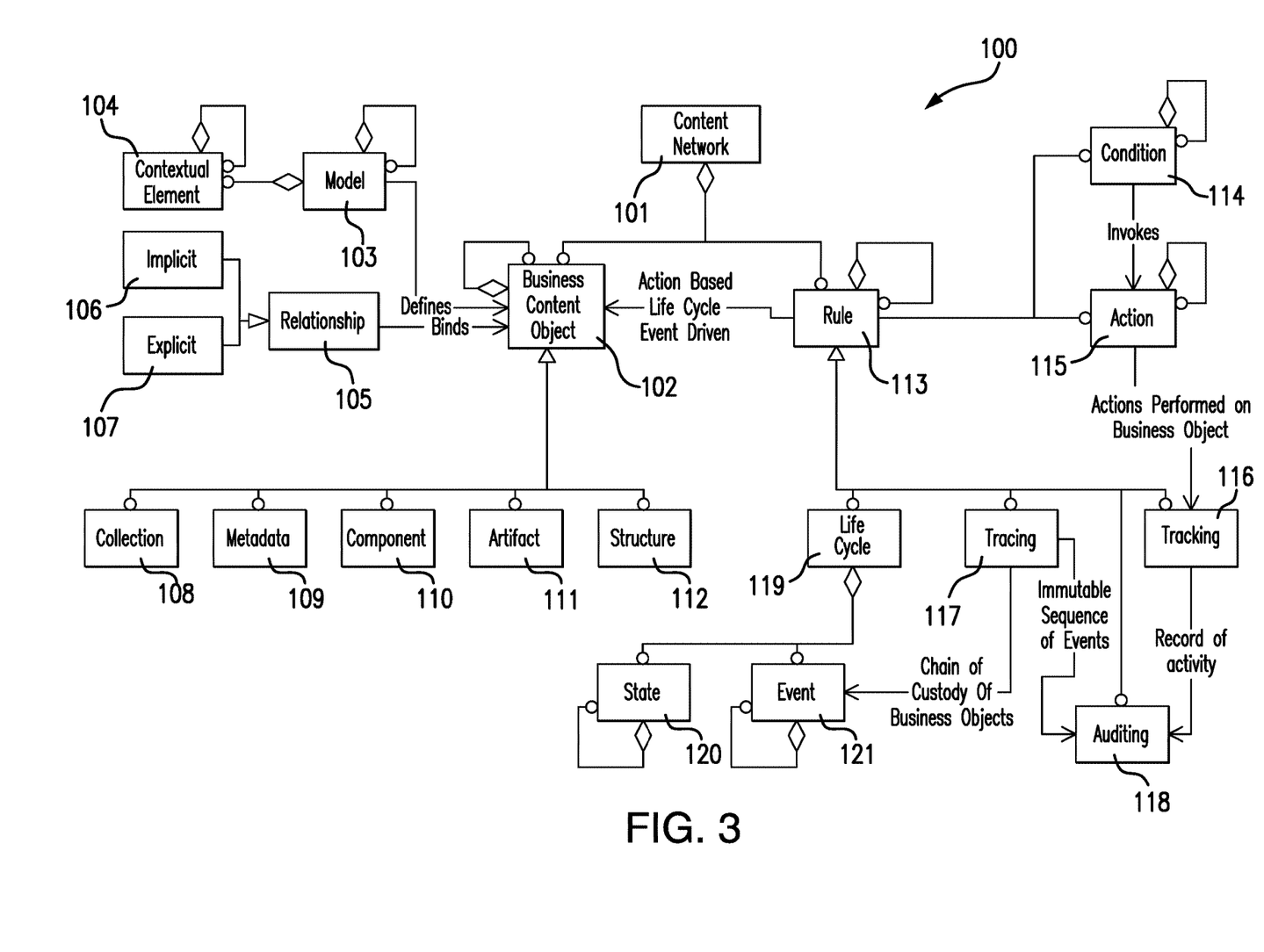
FIG. 3 is a schematic diagram of the overall entity relationship structure of the present invention.

FIG. 3 illustrates the overall entity relationship structure 100 of the present invention, in which the numerical references are explained as follows:

101 Content Network

The content network is made up of instances of related information artifacts defined by business users using a base set of object types, sets of models, context elements and relationships. The content network will organically grow in an orderly and controlled manner using rules that allow for invocation of actions based on a set of conditions applicable to the life cycle state of the information artifact.

102 Business Object

The business object is an individual component or document, or a collection of components and/or documents. Business objects can be defined by business users using a base set of object types (which can be components, artifacts, collections, structures, or a combination thereof, and their associated metadata), sets, nested models, sets of nested and reusable context elements and associated relationships. Associated to business object models will be business rules, which are applied to organically grow and manage the content network in a well-defined and controlled manner. Rules are used for invoking and controlling actions based on a set of conditions, applicable to the life cycle state of the content.

103 Model

User definable models of related business context elements and other models will be used to create and manage related information artifacts within a content network. Models can also re-use business contextual elements from other models. In combination with rules, the extensible modeling capability will support building structures and collections used to contain or collect both structured and unstructured information artifacts.

104 Contextual Elements

Contextual elements will be used to define extensible information artifact models used to support and manage business information management needs. Elements can be nested to unlimited levels, enabling the ability to create and manage complex content networks. This includes the capability of supporting and managing reusable content and related variants.

105 Relationships

Information artifacts and associated reusable contextual elements are bound together using relationships that may be explicit or implicit.

106 Implicit Relationships

Relationships that bind information artifacts can be implicitly visualized using the associated metadata and content indexes. Visualizations can be contextually filtered by user and process alike. Access to the relationship can be controlled via rules by setting conditions using the association of metadata and search query on the index.

107 Explicit Relationships

Relationships can be explicitly created via the creation of an edge between nodes representing information artifacts in the content network. Explicit relationships can have properties and metadata associated with them which can be used to govern, via life cycle based rules, the relationship as well as access to the relationship for the traversal of the path between the nodes via the edge.

108 Collection

A collection is a base type of information artifact used to aggregate together instances of other types of information artifacts. A Collection is a type of information artifacts that is defined by the model. Collections can be created using both implicit and explicit relationships. Any instance that is part of a collection will inherit business context based on the relationships and meta-information of instances within the collection, based on rules.

109 Metadata

Metadata is a base type of information artifact used to categorize and collect instances of other types of information artifacts. It is used to support findability and the conditions used for invoking rules-based actions. Metadata is a type of information artifact that is defined by the Model.

110 Component

A component is a base type of information artifact used to collect and manage content that can be used in structures. It is can be categorized using metadata and indexed to support findability. In addition, the categorization and/or index can be used as conditions for invoking rules-based actions. Components can be bound via a relationship to the extensible Model, such as a Structure, Collection and/or Artifact.

111 Information Artifact

An information artifact is a base type of object used to collect and manage content. It can be categorized using metadata and indexed to support findability. In addition, the categorization and/or index can be used as a set of conditions for invoking rules-based actions. The information artifact can be bound via a relationship to the extensible model such as a structure, collection, component, task, milestone, objective and/or other artifacts.

112 Structure

Structure is a base type of information artifact used to aggregate together instances of other types of information artifacts of base type artifact, component and structure. A structure can be created using explicit aggregation type of a relationships. Any instance that is part of a structure will inherit business context based on the relationships and meta-information of instances within the structure, based on rules. A Structure is a type of information artifact that is defined using a flexible and extensible model that includes reusing information elements from other models.

113 Rules

A content network evolves in a systematic, rules driven manner. Each instance of an information artifact, whether a component or an artifact, comes into existence and is managed via actions governed by event-based, life cycle driven rules. Rules are defined by business users setting the conditions that, when met, permit invoking applicable actions. The content network supports different kinds of rules, such as life cycle, and tracking and tracing, that facilitate the creation of an immutable chain of custody for a sequence of events based on the actions taken on information artifacts by the user or process that invoke the actions, based on business rules.

114 Condition

Conditions are defined by the users to control the actions that can be performed on the defined set of information artifacts activated within the content network. Conditions can be nested within the applicable models defined for the set of information artifacts.

115 Action

Actions performed on information artifacts can only be invoked when one or more applicable conditions are met. Actions are performed on the information artifacts, and the content network will in turn use rules to determine if these actions need to be tracked and included in an immutable record of activities (also called an audit trail). Rules can be defined to chain actions together as part of the sequence of events defined by the life cycle states of the information artifact.

116 Tracking

Rules can be set for the tracking actions performed on an information artifact within the content network to support findability via queries for searching and reporting on related activities. The tracking of the activity is a process that will create records that can be audited.

117 Tracing

Rules can be set to invoke cryptologic sequence services facilitated by blockchain technology to create an immutable chain of custody that will trace a sequence of events based on the actions performed on the information artifacts. The traces will be accessed via an audit event that assures the nonrepudiation and integrity of activities related to the information artifacts. Traces can be visually presented to the users and auditors alike, as well as supporting the findability of content based on meta-information that is being tracked.

118 Auditing

De-centralized repositories (also referred to as a distributed ledger system, facilitated by blockchain technology) that collect and connect records of activities are used to provide immutable traces of event-driven sequences for instances of information artifacts within the content network.

119 Life Cycle

All information artifacts will have an associated set of rules specific to its applicable life cycle. The foundation of life cycle rules will be defined using state and events to support action-based, event-driven, life cycle-controlled business processes. The conditions defined for the rules will control the path taken through the network, based on invoking the event-based action that causes the states to transition. The path can include a re-entry of the states, based on the rules defined, and is recorded via a cryptologic sequence service (facilitated by blockchain technology), creating an immutable trace of the sequence of events.

120 State

A life cycle associated to an information artifact model is defined by a set of distinct states that are used as the base condition that governs the actions that can be performed on instances of the model.

121 Event

Events are actions that cause a state to occur, are valid within a state, or cause a state to change. Events will be traced by the invocation of cryptologic sequence services (facilitated by blockchain technology) to create an immutable trace of these events.

Figure 4:
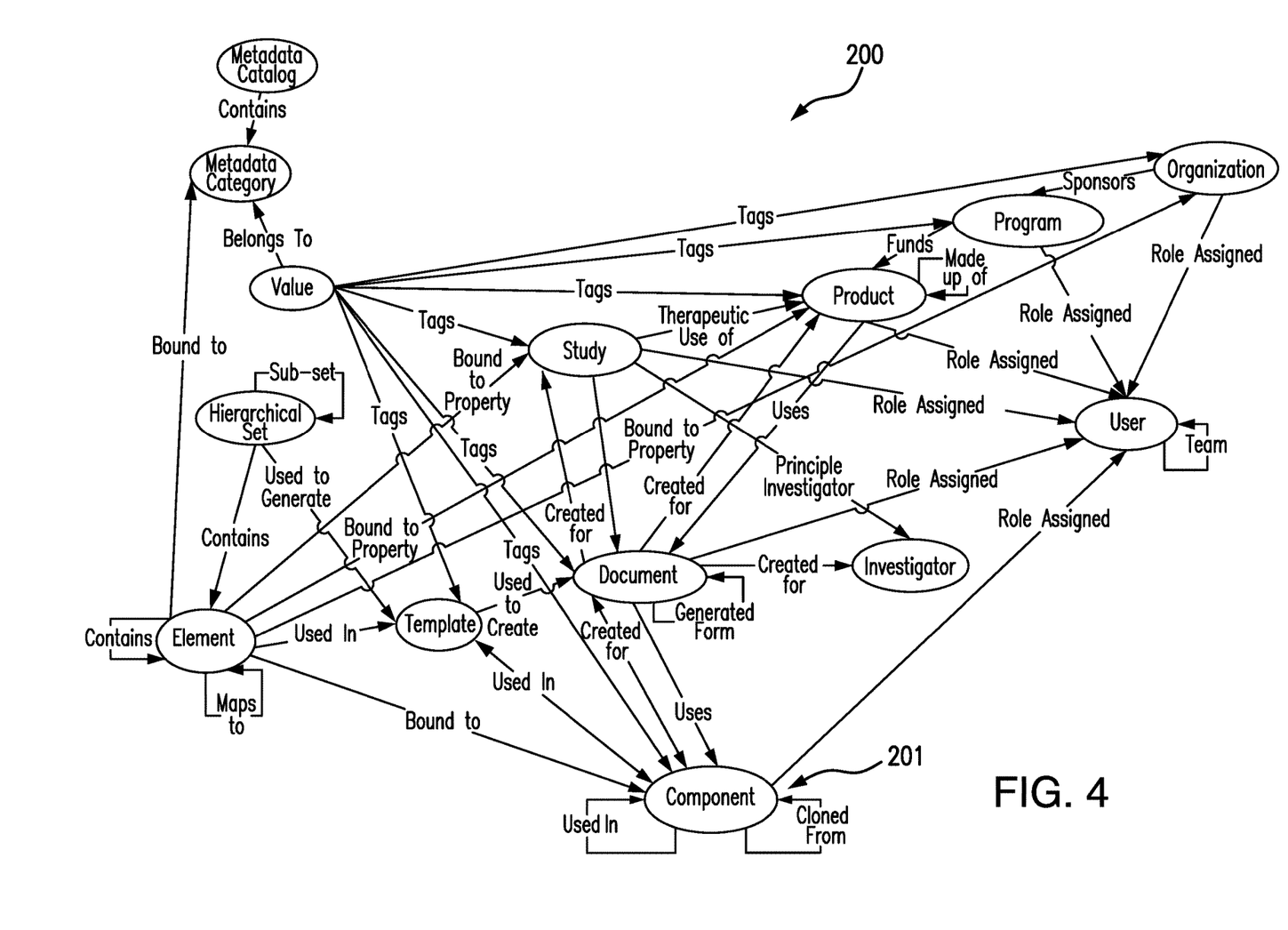
FIG. 4 is an exemplary embodiment of a network database architecture for an application to manage documents used in clinical trials.

Referring to FIG. 4, one embodiment of the document tracking invention is for clinical trials. The figure shows a detailed property graph model 200 that maps the documents and components 201 of a sample document set that is used in conducting clinical trials.

Figure 5A:
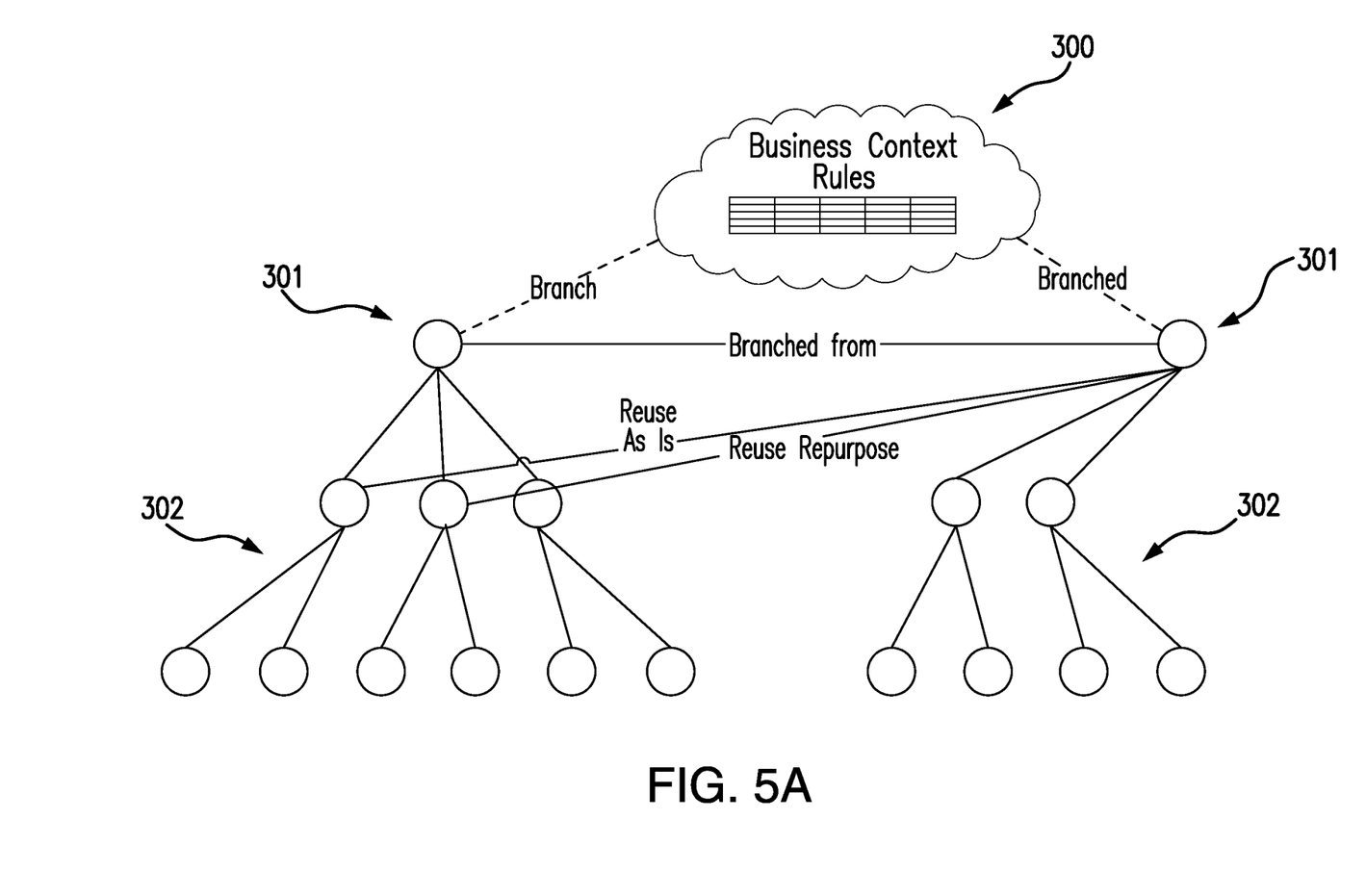
FIG. 5A is a schematic diagram illustrating the use of business context defined rules to control actions that branch instances of information artifacts.
Figure 5B:
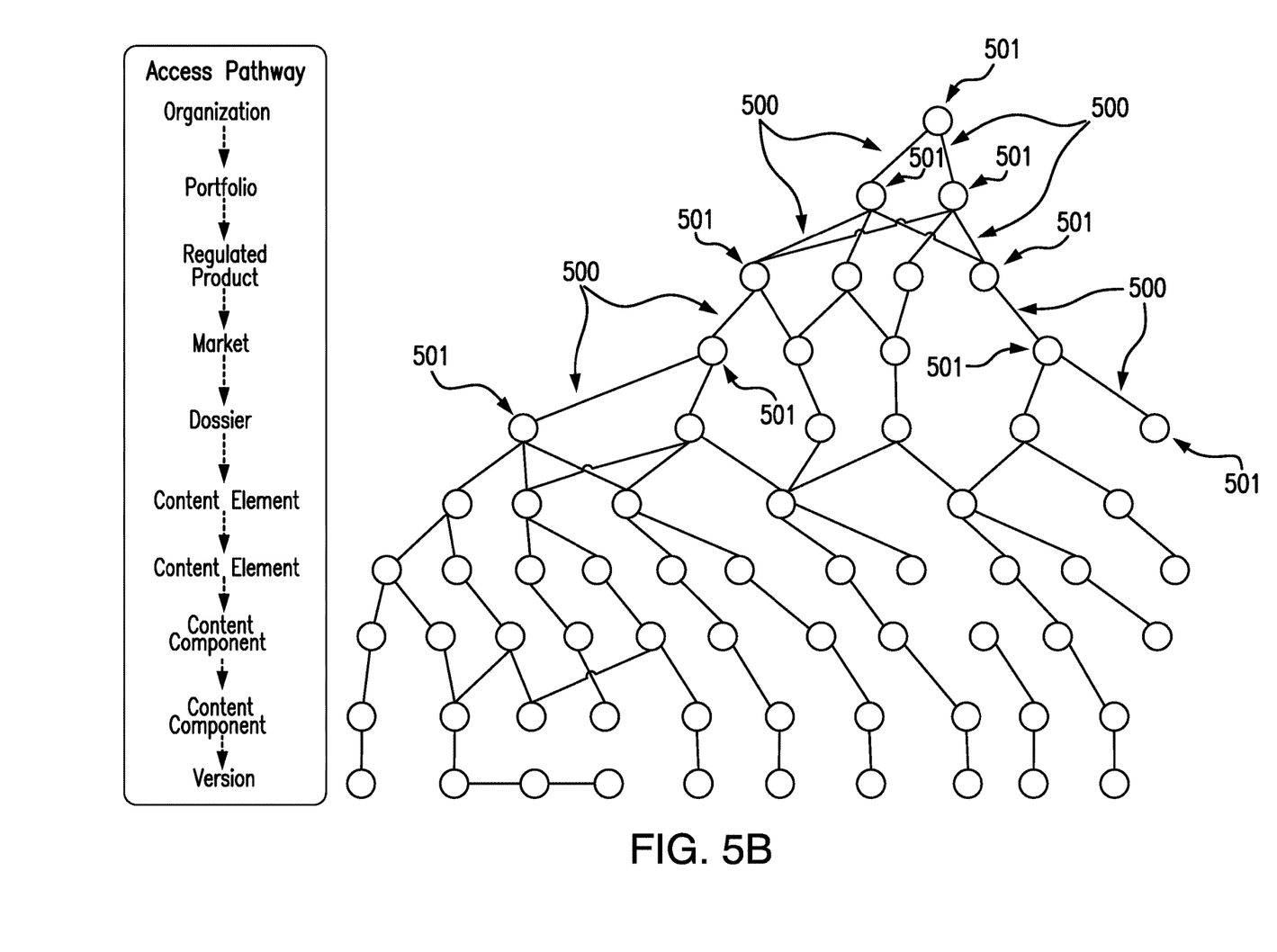
FIG. 5B is a schematic diagram illustrating the use of business context defined rules and access pathways to continuously govern non-distributed and/or distributed content networks comprised of information artifacts.
Figure 5C:
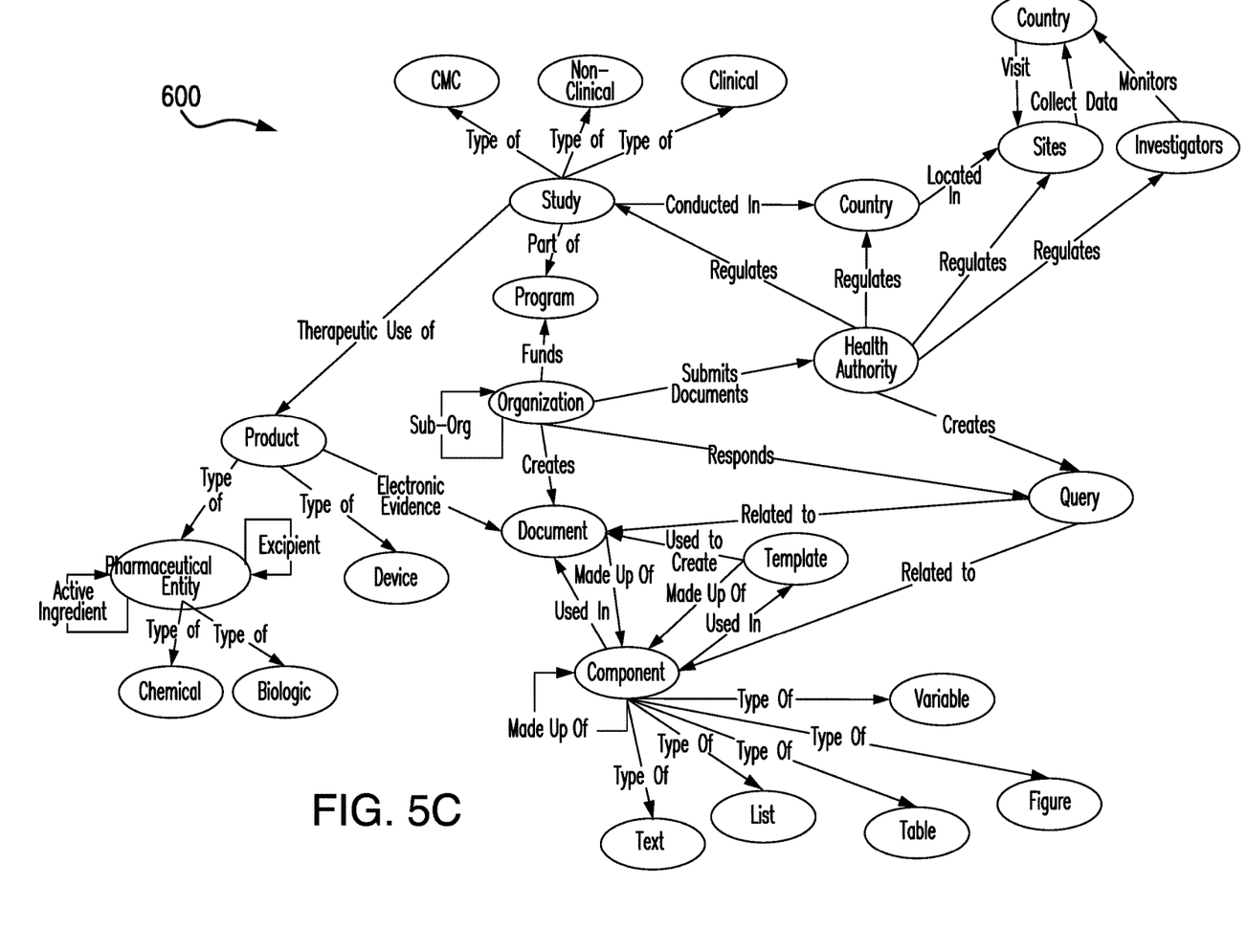
FIG. 5C is a schematic diagram illustrating a contextual network of business content comprised of information artifacts utilized for conducting clinical trials.

The role of business context based rules in the present invention is illustrated in FIGS. 5A, 5B and 5C. The present invention facilitates the dynamic creation of relationships and rules for the information component at any level and without limits to the number. The ability to create dynamic relationships and attach rules to each relationship, in the business context of the relationship, provides a highly flexible model to build information networks and manage them for changing business needs by extending the modeled information and not the underlying platform extension.

In the case of business rules, the rules can be defined and attached to the information artifact model at any element level, and the business context can be defined to trigger the rule.

Sets (one or more) of business context based conditions defined in the rules by the business user will be used to trigger the business logic, such as instantiating the branching mechanism that creates a network of content of the applicable information artifacts such as document structure, tasks and roles based access policies.

For example, business context defined rules 300 are used to control actions that branch instances of information artifacts 301 (FIG. 5A). Based on the conditions defined, such as the product type, regulations of country targeted for market, and life cycle state of information artifacts, the branching functionality can automate the creation of a branch and all the subordinated structures 302, specific to the context defined by the business user.

The rules will be used to continuously govern the evolution of non-distributed and/or distributed content networks made up of information artifacts. Networks will evolve and support connecting business contextual pathways to a vast array of different types of information structures and content. Access to pathways 500 (FIG. 5B) connecting related information artifacts 501 will also dynamically evolve, and be used to track, trace and route information 600 (FIG. 5C). Rules will control access to pathways 500 used by information artifacts 501, based on the need to know and right to know principles. In addition, these pathways 500 will support access control rules, trigger messaging between information artifacts 501, manage change and collaboration of authorized roles via business conditions and relationships that define the flow of information.

The content networks will aggregate and associate information based on the business context for tasks related to regulated marketed product variations. The end-to-end process is therefore managed and supported via the content network. Information is managed and flows are driven based on business context rules, such as a product variation, governed by changes in manufacturing processes, or addressing safety issues and health authority driven conditions.

Although the preferred embodiments of the present invention have been disclosed for illustrative purposes, those skilled in the art will appreciate that many additions, modifications and substitutions are possible, without departing from the scope and spirit of the present invention, as defined by the accompanying claims.

What is claimed is:

1. A computer-based method which provides integrated lifecycle management for multiple information artifacts, including auditing, tracking and tracing, structured content authoring, and component content management, the method comprising:
    (a) providing a network database, comprising a graph database, or a graph-enabled relational database, or a multi-model database;
    (b) providing a means to manage the lifecycle of multiple information artifacts, wherein each information artifact can be a discrete information artifact, comprising a discrete metadata value, task, milestone, objective, content component or a discrete document, or a composite information artifact, comprising a group of metadata values, tasks, milestones, objectives and content components or a group of documents;
    (c) using the network database to structure the information artifacts into a network information model;
    (d) representing each of the information artifacts of the network information model as a discrete artifact node within the network database;
    (e) representing each of the artifact nodes as a content component, a document, a metadata term, an attribute term, a content placeholder, a link, a link to an external content library, or a database;
    (f) assigning attributes and rules to each artifact node;
    (g) assigning attributes and rules to the network information model;
    (h) tracking and managing, within the network information model, each of the information artifacts that represent a business information object;
    (i) structuring and representing one or more of the information artifacts as re-usable components in relation to multiple re-use types, each of which is associated with a re-use rule, wherein the re-use types distinguish between re-usable components which are re-used as-is and re-usable components which are derived, modified and/or re-purposed;
    (j) representing relationships between the artifact nodes as a set of edges within the network database, wherein the relationships between the artifact nodes comprise lineage relationships, re-use relationships and published content relationships, and wherein the lineage relationships define derivations of one or more derivative information artifacts from one or more source information artifacts, so as to enable the derivative information artifacts to be traced to the source information artifacts, and wherein the re-use relationships exist between one or more originating information artifacts and one or more information artifacts in which the originating information artifacts are re-used, and wherein the published content relationships exist between one or more information artifacts comprising published content and one or more information artifacts comprising original content components from which the published content was sourced;

(k) representing the re-use rules within the network information model or across multiple information model structures;
(l) designating a lifecycle state of each artifact node, wherein the life cycle state is selected from the group consisting of draft, review, approval and published, and wherein, in the life cycle state of review, the information artifact represented by the artifact node is published in an editable format to a collaborative workspace, and wherein, in the life cycle state of approval, the information artifact represented by the artifact node is published to a records management system in a read-only format, and wherein, in the life cycle state of published, the information artifact represented by the artifact node is published to a content storage system;
(m) linking the network database to the content components comprising a published document, so as to track each content component through the network database by assigning to each content component a digital identifier that represents the artifact node associated with the content component;
(n) configuring one or more metadata models to leverage managed metadata terms or managed terms from one or more master data sources or external data sources;
(o) creating work processing templates having content control bindings to related information artifacts within the network information model, so as to control the behavior of the content components during an authoring and publishing process; and
(p) providing an audit trail tracking system.

2. The method of claim 1, wherein the network database incorporates a system architecture comprising:
(a) one or more industry schemas that control a required content and/or a required structure of database information and apply regulatory requirements and controlled vocabularies defined by regulatory and/or standard-setting bodies;
(b) a configurable lifecycle manager, which defines multiple lifecycle-based business rules to initiate, manage and transition multiple lifecycle states, and which defines multiple role-based business rules to control access to user actions performed on the database information and the content components;
(c) a configurable workflow template manager, which defines workflows for routing of the content components or composite objects, including the documents, for purposes of review, quality control and approval;
(d) a configurable notification manager, which defines multiple automated notifications to be generated and routed based on specified events, including lifecycle changes of content components or of composite information artifacts, including the documents;
(e) a security policy manager based on a attribute and role based access control mechanism, which defines and governs the access controls to the content components or the composite objects, including the documents;
(f) a user interface, which provides secure access to the network database using open authentication standards, and which governs user capabilities with respect to the lifecycle states and the user actions, subject to the lifecycle-based business rules, the role-based business rules, and the industry schemas;
(g) an application, which calls upon the lifecycle manager to manage the lifecycle states of the database information and the content components in compliance with the industry schemas and to manage workflow processes used to control, transition and track the lifecycle states;
(h) an extensible component registry, which manages, under the control of the lifecycle manager, a manifest that identifies in which of the documents different revisions and versions of the content components are being used, wherein the manifest shows an end-to-end chain of custody of the database information and associated information artifacts, based on the lifecycle-based business rules;
(i) a metadata manager, comprising metadata used to instantiate properties represented in the nodes and edges of the network database and variables embedded in the content components;
(j) an Internet stack application programming interface (API), based on Representational State Transfer (REST), to support creation of a scalable Web Service, and utilizing an open standard format of JavaScript Object Notation (JSON) to transmit data objects consistently, such that the API can be evolved and adjusted seamlessly as business needs evolve;
(k) one or more indexes, which are accessed by the API and used to search the properties of the nodes and edges of the network database and to find and retrieve the database information; and
(l) a document storage system, to which the lifecycle manager can publish documents based on the lifecycle states of the documents, and which provides access to the documents in order to retrieve, move or replace one or more of the documents, and which embeds digital tracking IDs into the documents as indexable hidden text, so that the tracking IDs can be indexed and the documents can be searched and located, wherein the tracking ID of each of the documents is included in the metadata of the document.

3. The method of claim 2, wherein the system architecture of the network database further comprises:
(m) a structured content authoring system, which uses the word processing templates with the content control bindings to related information artifacts within the network information model to drive the behavior of the document during the authoring process;
(n) information model binding supporting reuse policies defined at a level of the content components;
(o) the information model binding directed to the metadata term or the attribute term so as to allow user selection of an applicable value for the metadata term or the attribute term;
(p) the information model binding directed to a content library to allow user selection of an applicable content from the content library;
(q) the information model binding directed to an external database to allow user selection of an applicable value from the external database; and
(r) a capacity to publish and save the content components and the composite objects, including the documents, to the document storage system.

4. The method of claim 3, wherein the system architecture of the network database further comprises:
(s) an audit trail tracking and tracing system, based on a blockchain process, which establishes an immutable chain of custody of the documents and the content components, in terms of user actions governed by the lifecycle manager, and which records all user actions via the blockchain process.

* * * * *